United States Patent [19]
Hall

[11] Patent Number: 5,330,064
[45] Date of Patent: Jul. 19, 1994

[54] SUPPORT ASSEMBLY FOR A HOLDING RACK

[76] Inventor: Donald M. Hall, P.O. Box 1247, Progress St., Kingston, N.Y. 12401

[21] Appl. No.: 53,801

[22] Filed: Apr. 29, 1993

[51] Int. Cl.⁵ .............................................. A47F 5/00
[52] U.S. Cl. ...................................... 211/182; 16/29; 16/30; 248/188.8; 280/79.3
[58] Field of Search ............... 211/182, 189, 194, 133; 280/79.3; 248/188.7, 188.8, 188.9; 16/20, 29, 30, 31 A, 31 R, 42 T, 39, 46

[56] References Cited

U.S. PATENT DOCUMENTS

| | | |
|---|---|---|
| 1,022,056 | 4/1912 | Bassick . |
| 1,180,259 | 4/1916 | Diss ......................................... 16/29 |
| 1,333,604 | 3/1920 | Brown . |
| 1,468,293 | 9/1923 | Herold ............................ 16/31 R X |
| 1,473,379 | 11/1923 | Noelting . |
| 1,734,057 | 11/1929 | Sutton . |
| 1,953,636 | 4/1934 | Skelton . |
| 2,735,589 | 2/1956 | Milster et al. ................. 280/79.3 X |
| 2,774,609 | 12/1956 | Winger . |
| 3,022,535 | 2/1962 | Black . |
| 3,452,386 | 7/1969 | Carlson ....................... 248/188.9 X |
| 3,487,495 | 1/1970 | Schultz, Jr. . |
| 4,459,920 | 7/1984 | Cwik ............................ 248/188.8 X |
| 4,588,096 | 5/1986 | Story et al. .................... 280/79.3 X |
| 4,788,741 | 12/1988 | Hilborn . |
| 4,998,023 | 3/1991 | Kitts ............................... 280/79.3 X |
| 5,125,520 | 6/1992 | Kawasaki ......................... 211/194 X |

Primary Examiner—Robert W. Gibson, Jr.
Attorney, Agent, or Firm—Shlesinger, Arkwright & Garvey

[57] ABSTRACT

The support assembly includes an upright member, an exterior support member adjacent to the upright member, the exterior support member being configured for being disposed between the upright member and an outer perimeter of a frame of a holding rack, a caster disposed substantially below the exterior support member, and the caster including an extension received in a hollow tube of an upright member. Another embodiment of the invention includes a holding rack having a frame defining an outer perimeter, and an upright member disposed at the outer perimeter of the frame that is a part of a support assembly, an exterior support member adjacent to the upright member, the exterior support member being configured for being disposed between the upright member and an outer perimeter of a frame of a holding rack. A caster is disposed substantially below the exterior support member, the caster including an extension received in a hollow tube of the upright member.

13 Claims, 2 Drawing Sheets

SUPPORT ASSEMBLY FOR A HOLDING RACK

FIELD OF THE INVENTION

This invention is related to a support assembly for a holding rack, and to a holding rack incorporating such a support assembly. It should be understood that the support assembly according to the invention could be used to support objects others than holding racks.

BACKGROUND OF THE INVENTION

Supports and support assemblies have long been used to elevate racks and other objects off the ground, so as to provide space between a lowermost functional part of the rack, for example. Support assemblies, including wheels and casters, provide the additional benefit of enhanced mobility of a rack to which the wheeled support assemblies are attached.

Conventional support assemblies and holding racks are expensive to fabricate, costly to ship, unhygienic, and often have structural features which reduce the amount of available space for holding stored materials thereon.

For example, a prior art knock-down dolly with disassembly facilitating means is disclosed in U.S. Pat. No. 2,774,609 to Winger. The Winger dolly is assembled by use of parts having dove tail joints, other take-apart structural parts, and casters located directly in the corners of the rectangular Winger frame. Given the location of the casters directly at the intersection of the Winger frame members making up the sides of the traditional rectangular dolly, usable space is lost between the front and rear corner posts which extend above the Winger casters. This lost space will be readily recognized when one considers that a tray or bread pan, for example, can only be inserted between the inner faces of the corner posts. Furthermore, the lost space restricts the amount of surface area available for supporting the edge of a tray that would otherwise have been provided by the top face of the Winger end pieces forming part of the traditional rectangular frame, as the edges of a tray must be spaced inwardly therefrom. Furthermore, it is difficult and expensive, if not completely impractical, to bolt a detachable caster assembly directly in the corner of a frame. In addition, dove tail joints, such as used by Winger, are expensive to fabricate and difficult to assemble readily.

U.S. Pat. No. 3,487,495 to Schultz, Jr., discloses a steel bracket 14 which is a metal stamping configured for receiving the pintle or shaft member of a caster assembly, and to be received, in turn, in a rectangular leg or housing of a piece of furniture. Although the Schultz caster assembly is no doubt inexpensive to manufacture, its construction is not suited for heavy duty use.

OBJECTS AND SUMMARY OF THE INVENTION

Accordingly, it is an object of the invention to provide a support assembly for a holding rack, and a holding rack incorporating the support assembly, which overcome the drawbacks and disadvantages of the prior art devices.

Another object of the invention is to provide a support assembly for a holding rack, and a holding rack incorporating such, which can be inexpensively manufactured.

Yet another object of the invention is to provide a support assembly for a holding rack, and a holding rack incorporating such an assembly, which can be shipped in a disassembled condition so that shipping costs are reduced by the use of U.S. Post Office Parcel Post Service, the United Parcel Service ® (UPS), and the like, for shipping, as opposed to the more expensive alternative of shipping by common carrier. Shipping by common carrier is required when such holding racks are transported fully assembled.

A still further object of the invention is to provide a holding rack which has more usable space than conventional holding racks.

A further object of the invention is to provide a holding rack which is stronger than conventional holding racks, yet which makes use of various, less expensive materials in its construction.

Another object of the invention is to provide a support assembly for a holding rack, and a holding rack incorporating such, which can be readily assembled and disassembled by the end user.

It is yet another object of the invention to provide a support assembly for a holding rack, and a holding rack incorporating such, which includes detachable components having relatively close tolerances for enhancing the strength of joined components, even when components made of different materials are used, and yet which is readily disassembled and assembled despite the relatively close tolerances of the fitted components.

A yet further object of the invention is to provide a support assembly for a holding rack, and a holding rack incorporating such a support assembly, which is easier to use, when assembled, than existing holding racks.

Another object of the invention is to provide a support assembly for a holding rack, and a holding rack incorporating such, which is as strong as a unitary holding rack, yet which can be readily disassembled for replacing individual components, as required.

A still further object of the invention is to provide a support assembly for a holding rack, and a holding rack incorporating such a support assembly, which facilitates the mating of nestable holding racks.

Another object of the invention is to provide a support assembly for a holding rack, and a holding rack incorporating such a support assembly, in which the support assembly can be easily attached to the holding rack by use of a readily accessible, single fastener per support assembly.

Yet another object of the invention is to provide a support assembly for a holding rack, and a holding rack incorporating such a support assembly, which can be assembled with hand tools, and which requires no welding for assembly.

In summary, therefore, the invention is directed to a support assembly for a holding rack, and a holding rack incorporating such a support assembly, which is strong, cost-effective, and which has increased holding capacity, and which is inexpensive to produce and to ship.

In one embodiment of the invention, the support assembly includes an upright member, an exterior support member adjacent to the upright member, the exterior support member being configured for being disposed between the upright member and an outer perimeter of a frame of a holding rack, a caster disposed substantially below the exterior support member, and the caster including an extension received in a hollow tube of the upright member, whereby the caster extension or stem functions to strengthen the support assembly in general, and the hollow tube in particular.

Another embodiment of the invention includes a holding rack having a frame defining an outer perimeter, and an upright member disposed at the outer perimeter of the frame. The upright member is part of a support assembly which includes an exterior support member adjacent to the upright member, the exterior support member being configured for being disposed between the upright member and an outer perimeter of a frame of a holding rack, a caster disposed substantially below the exterior support member, and the caster including an extension received in a hollow tube of the upright member.

The invention will be further described with reference to the following drawings.

BRIEF DESCRIPTIONS OF THE DRAWINGS

Figure 3:
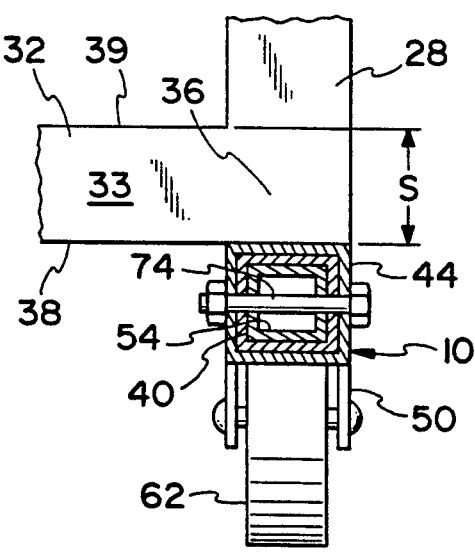
FIG. 3 is a top, partially sectional view, of the first preferred embodiment of the invention, taken along line 3—3 of FIG. 2.
Figure 5:
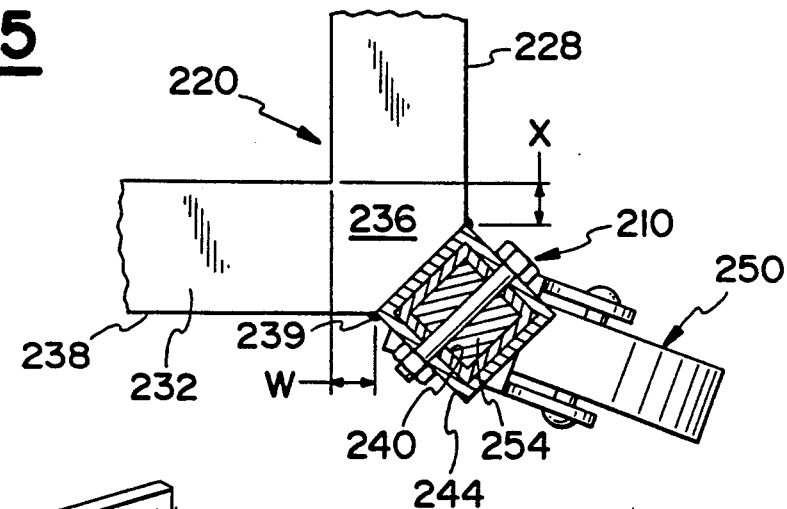
Figure 6:
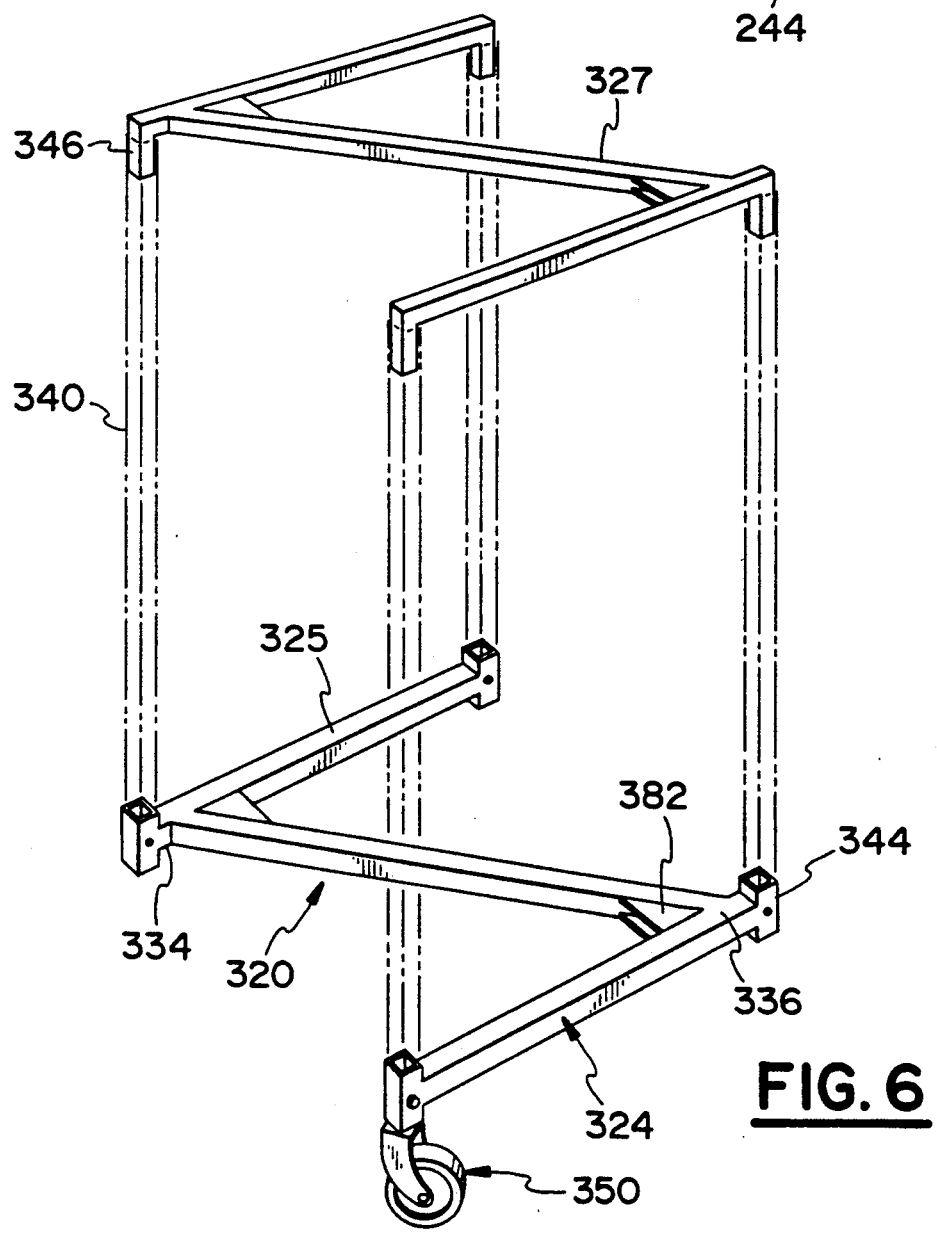

FIG. 5 is a top, partial sectional view of a further preferred embodiment of the support assembly for a holding rack according to the invention, similar to FIG. 3; and FIG. 6 is a perspective, somewhat schematic view of a still further preferred embodiment of the support assembly and holding rack incorporating such, according to the invention, in which the holding rack incorporates substantially Z-shaped frames.

DETAILED DESCRIPTION OF THE INVENTION

Figure 1:
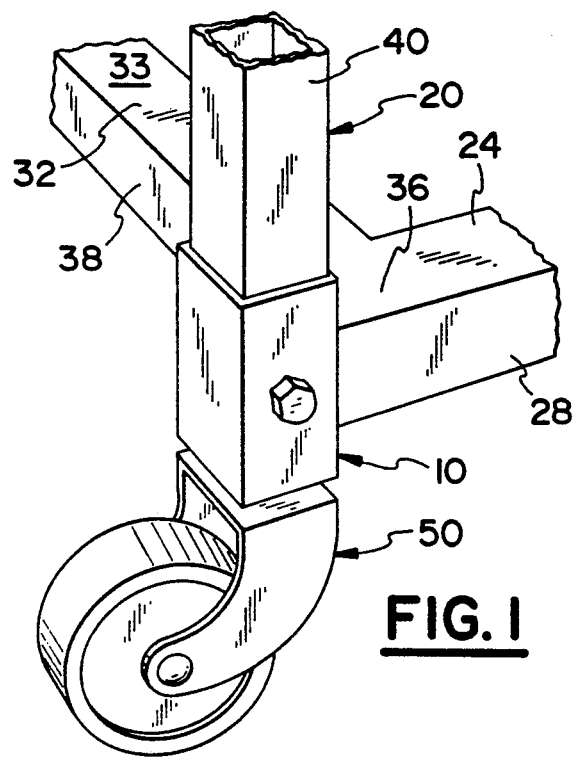
FIG. 1 is a perspective view of a support assembly for a holding rack according to the invention that is located offset from the corner of a frame of a holding rack, according to a first preferred embodiment of the invention.
Figure 2:
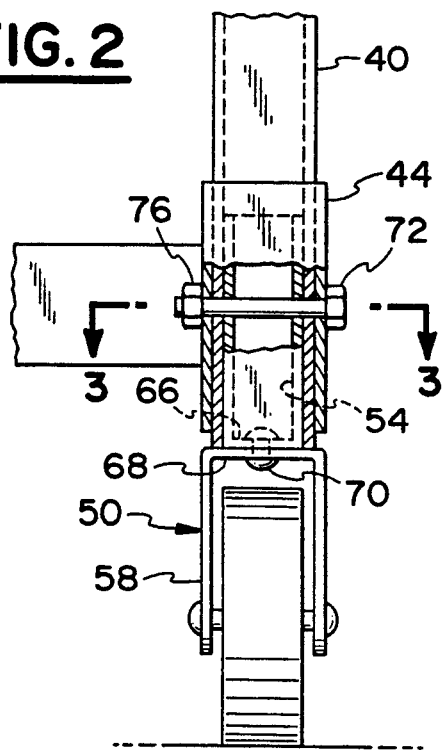
FIG. 2 is a partially cross-sectional, side elevational view of the first preferred embodiment of FIG. 1.

FIGS. 1-3 illustrate a first preferred embodiment of a support assembly 10 for a holding rack 20 according to the invention.

Holding rack 20 includes a frame 24 have a first frame member 28 and a second frame member 32 extending transversely from first frame member 28 and joined thereto at a corner 36. Second frame member 32 has a top surface 33 and includes an outer perimeter defining a vertical face 38. There is likewise an inner perimeter defining vertical face 39.

An upright 40 is located adjacent corner 36 of frame 24. An exterior support member 44 is disposed between upright 40 and outer perimeter or vertical face 38 of frame 24.

A conventional caster 50 is positioned below and rotatably secured relative to upright 40 and relative to exterior support member 44 by means of an extension 54. Caster 50 further includes a downwardly extending wheel support 58 rotatably securing a conventional wheel 62.

A lower portion 66 of extension 54 is pivotably connected to an upper part 68 of caster 50 by means of a conventional pivot connection 70. A bolt or other fastener 72 having a shaft 74 detachably connects, in turn, exterior support member 44, upright 40, and extension 54. Bolt 72 is releasably retained by use of a nut 76. In the preferred embodiment, or "best mode", extensions 54 will be solid, as shown and described below in regard to the extension used in the embodiment of FIG. 5.

Figure 4:
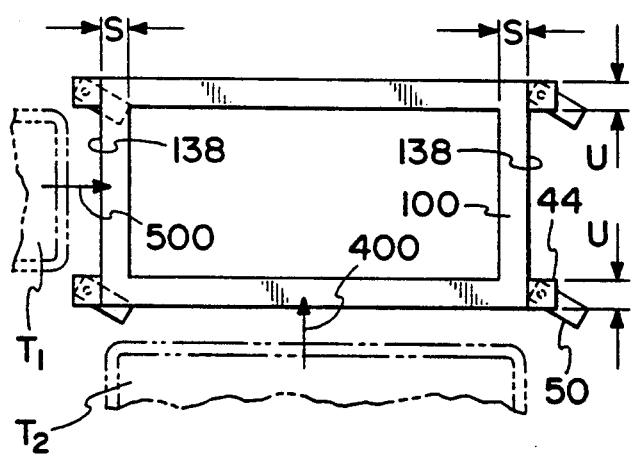
FIG. 4 is a top, somewhat schematic view of a holding rack according to the invention having a rectangular frame, and support assemblies according to the invention disposed offset from the corners thereof.

FIG. 4 schematically illustrates a further embodiment of the support assembly and holding rack according to the invention in which a rectangular frame 100 defines an outer perimeter or vertical face 138 to which a plurality of exterior support members 44 is attached. Casters 50 are rotatably attached to the corners of this further preferred embodiment as in the embodiment of FIGS. 1-3.

A still further preferred embodiment of a support assembly 210 according to the invention is shown in FIG. 5. In this still further preferred embodiment of the invention support assembly 210 is attached obliquely at a corner 236 defined by a first frame member 228 and a second frame member 232. One or more welds 239 may be provided for strengthening the connection between an outer perimeter or vertical face 238 of second frame member 232 and an exterior support member 244. An upright 240 receives an extension 254 of a caster 250. In this embodiment, an extension 254 of caster 250 is made of a solid piece of barstock.

FIG. 6 illustrates a yet still further preferred embodiment of the invention illustrating a holding rack 320 having a substantially Z-shaped frame 324. Z-shaped frame 324 includes a lower frame member 325 and a spaced opposed upper frame member 327. Lower frame member 325 includes relatively short frame extensions 334 extending away from intersections or corners 336.

Exterior support members 344 are attached to frame extensions 334 by welding or other means. Exterior support members 344 detachably receive conventional casters 350 in a manner similar to the above-described preferred embodiments. Uprights 340 are received in exterior support members 344 as in the earlier embodiments, and detachably receive downwardly extending legs 346 of upper frame member 327.

It is contemplated that legs 346 of upper frame member 327 be made of material having the same nominal dimensions as exterior support members 344 so as to receive respective uprights 340 on the interior of legs 346. Upper frame member 327 can be snugly, detachably secured to upright 340 as shown, or detachably attached by use of conventional fasteners, in a manner similar to the attachment of casters 350 to exterior support members 344 by the use of bolts or the like.

OPERATION

The support assembly 10 and holding rack 20 of the embodiment of FIGS. 1-3 is used as follows.

The end user or, preferably, factory personnel, attach exterior support member 44 to vertical face 38 of frame 24, such as by welding, rivets, or spot welding. Preferably, holding rack 20 is shipped disassembled. When holding rack 20 is to be used, upright 40 is inserted into exterior support member 44 from above, as viewed in FIG. 2. Then, extension 54 is inserted into the interior of upright 40 from below. After the apertures in each of upright 40, exterior support member 44 and extension 54 have been aligned, bolt 72 is inserted therethrough. Of course, bolt 72 may be used in assisting to align the various components, such as by inserting bolt 72 partially into the apertures of upright 40 and exterior support member 44 for securing those two outermost members relative to each other, prior to the insertion of extension 54 of caster 50.

To assist in the assembly of support assembly 10, the distance between the bolt-receiving aperture defined in upright 40 and the lowermost free end of upright 40 can be selected so that the lowermost free end abuts upper part 68 of caster 50 to assist in the alignment with the apertures extending through extension 54, as best seen in FIG. 2.

In a preferred construction, the lowermost free end of exterior support member 44 does not contact upper part 68 of caster 50.

In an equally preferred unillustrated embodiment, the distance between the aperture defined through exterior support member 44 and its lowermost free end is substantially the same as the distance between the bolt-receiving aperture defined in upright 40 and its lowermost free end.

It is also contemplated that the lowermost free ends of both upright 40 and exterior support member 44 do not contact upper part 68 of caster 50.

Still further, it is expected that for certain applications, and depending on fabrication costs and capabilities, there will be situations where it is preferred that only the lowermost free end of exterior support member 44 contacts upper part 68 of caster 50, while the lowermost free end of upright 40 remains spaced above upper part 68, when support assembly 10 is fully assembled.

Needless to say, each of the four variations of the manner in which the lowermost free ends of upright 40 and exterior support member 44 contact or remain spaced from upper part 68, described immediately above, represent tradeoffs between strength and fabrication cost, such as the cost of accurately locating the apertures and the respective parts relative to the free ends thereof.

Also, depending on the overall weight of holding rack 20, it may be relatively easy to assemble the support assembly without the aid of the lower free end of exterior support member 44 and upright 40 contacting upper part 68 for assisting in the alignment of the respective apertures.

Turning to FIG. 3, it will be readily understood how the offset location of exterior support member 44 and, hence, support assembly 10, relative to frame 24, establishes a relatively wide support space S defined between outer perimeter or vertical face 38 and inner perimeter or inner vertical face 39 of second frame member 32. In other words, substantially the entire top surface 33 of second frame member 32 is available for receiving and supporting a tray such as a conventional bakery pan or other wide objects received on frame 24 when holding rack 20 is in use.

In conventional racks, in which the casters and supporting assemblies are located directly at the corner defined by the intersection of the frame members, no relatively wide support space S is available. This can be further appreciated by considering FIG. 4, in which the insertion of a schematically illustrated conventional tray $T_1$ is inserted in the direction of arrow 400 between spaced apart exterior support members 44. As can be appreciated from viewing the insertion of a different tray $T_2$ in the direction of arrow 500 from the left as viewed in FIG. 4, the width of the space U "behind" exterior support member 44 is unavailable as a supporting surface for a tray inserted in the direction of arrow 500.

FIG. 5 illustrates the further preferred embodiment of the support assembly 210 and holding rack 220 according to the invention in which the disposition of exterior support member 244 at corners 236 provides for use of at least a part of the upper surfaces of first frame member 228 and second frame member 232, respectively. Available space for supporting a rack, for example, has a width W for receiving racks inserted in one direction, and a width X for receiving racks inserted in another direction, widths W and X being defined in a manner analogous to the definition of the width of the available supporting space in the above-described embodiments of the invention.

Z-shaped holding rack 320 of FIG. 6 is nested with other unillustrated Z-shaped racks, in a conventional manner, when in use. Gussets 382, if provided for additional strength, are preferably welded, riveted, or spot welded to lower frame member 325 and upper frame member 327, respectively, during initial fabrication of holding rack 320. As in the previous embodiments, holding rack 320 is shipped in a completely disassembled condition, and put together on-site by the end user in a manner similar to the assembly of the earlier embodiment.

It is contemplated that single gussets be used. 10-gauge steel plate has been successfully used for the illustrated two gusset construction.

It has been found that the provision of snugly fitting uprights receiving extensions of conventional casters, and then being received in turn by the novel exterior support members, yields a strong construction even though the assembly is by means of a detachable fastener, such as a bolt, and not by welding. It has been discovered that, apparently, given the close tolerances, little movement or deflection of upright 40 is possible, so that a relatively weak and inexpensive material, such as aluminum or plastic, can be used for upright 40, while the remaining components are made of carbon steel or stainless steel. The uprights have also been successfully made of carbon steel and used with first and second frame members made of stainless steel. The uprights can be likewise made of light-gauge carbon steel, while the frame members are made of heavy duty carbon steel. For instance, the upright could be made of lightweight steel tubes having baked on enamel outer coatings.

In the food service industry, for example, it is preferable that the flat, supporting surfaces, such as the frame, be made of stainless steel for ease of cleaning and for extended life, even when repeatedly subjected to liquids, and frequent cleaning. When the uprights are made of aluminum, there is the added benefit that the overall weight of the holding rack is reduced, thereby making the rack easier to maneuver, and less expensive to fabricate and to ship.

It is further contemplated that the support assembly be used directly in the corner defined by the intersecting first and second frame members of the frame, as in conventional racks. The loss of usable support space is offset by the benefit of increased strength and decreased cost of materials thanks to the structure of Applicant's support assembly per se.

It is further contemplated that the exterior support members be located directly at the intersection of the frame members defining the Z-shaped frame, in a variation of the preferred embodiment of FIG. 6.

It is also expected that legs or other supports having no wheels may be substituted for the casters.

It is likewise contemplated that for heavy duty applications, or where redundancy is required, multiple bolts will be used to attach the support assembly to the frame. For example, it is expected that for certain applications, the exterior support members will be lengthened, so that an additional bolt can be inserted through the various members at, for example, an angle of 90° relative to one or more additional bolts extending through the members. For example, in the embodiment of FIG. 5, a second nut and bolt would be used axially spaced apart from and extending substantially perpendicular to the bolts depicted in FIG. 5 for additional security and redundancy. In such a case, the bolt head or nut would be preferably located in a space next to an outer side of the exterior support member in the vicinity of Reference Numeral 236 designating the corners.

The bulk of the materials used is preferably metal, but strong, heat-resistant and corrosion-resistant plastics could also be used.

It is expected that C-channels, "u" channels, and fabricated angles and the like, be substituted for the hollow tubes of the frame. When C-channels are used, it is expected that rivets and spot welding will fasten together the various components, as will be appreciated by a person having ordinary skill in the art.

It is also contemplated that fixed, non-rotating casters having a standard extension or stem may be used in the invention as substitutes for the depicted rotating casters.

In addition, it is expected that the overall shape of the holding rack, such as generally dictated by the configuration of its frame, will include circular, triangular, and other polygonal configurations depending on the end use contemplated.

It is also contemplated that as many as six or more casters will be used on a holding rack, depending on the expected heavy duty use for which the rack is constructed. Rotating casters will be used at the "front" of a holding rack according to the invention, while non-rotating casters will be used at the "rear" of the rack, depending on the intended use of the rack.

It is contemplated that a rivet or other fasteners be used instead of the bolt for securing the various members.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A support assembly for a holding rack, said support assembly comprising:
   a) an upright member;
   b) said upright member including a hollow tube;
   c) an exterior support member disposed adjacent to said upright member, said exterior support member being configured for being disposed between said upright member and an outer perimeter of a frame of a holding rack;
   d) a caster disposed substantially below said exterior support member;
   e) said caster including an extension configured for being received in said hollow tube; and
   f) said extension being received in said hollow tube.

2. A support assembly as defined in claim 1, wherein:
   a) a bolt is provided for releasably attaching together said upright member, said exterior support member, and said extension of said caster.

3. A support assembly as defined in claim 1, wherein:
   a) means is provided for detachably attaching said upright member to said exterior support member and to said extension of said caster.

4. A holding rack, comprising:
   a) a frame having an outer perimeter;
   b) an upright member disposed at said outer perimeter of said frame;
   c) said upright member including a hollow tube;
   d) an exterior support member disposed between said upright member and said outer perimeter of said frame;
   e) a caster disposed substantially below said exterior support member;
   f) said caster including an extension configured for being received in said hollow tube; and
   g) said extension being received in said hollow tube.

5. A holding rack as defined in claim 4, wherein:
   a) a bolt is provided for releasably attaching together said upright member, said exterior support member, and said extension of said caster.

6. A holding rack as defined in claim 4, wherein:
   a) means is provided for detachably attaching said upright member to said exterior support member and to said extension of said caster.

7. A holding rack as defined in claim 4, wherein:
   a) said frame includes a substantially hollow tube having an outer face, and said exterior support member is attached to said outer face.

8. A holding rack as defined in claim 4, wherein:
   a) said frame is a substantially rectangular member having spaced apart corners; and
   b) said upright member is disposed at one of said spaced apart corners.

9. A holding rack as defined in claim 4, wherein:
   a) said frame is a substantially Z-shaped member having two corners and two free ends; and
   b) said upright member is disposed at one of said two free corners and two free ends.

10. A holding rack as defined in claim 4, wherein:
    a) said frame includes a pair of spaced opposed upper and lower Z-shaped members; and
    b) said upright member extends between said upper and lower Z-shaped members.

11. A holding rack as defined in claim 4, wherein:
    a) said frame comprises stainless steel.

12. A holding rack as defined in claim 11, wherein:
    a) said upright comprises aluminum.

13. A holding rack as defined in claim 11, wherein:
    a) said upright comprises carbon steel.

* * * * *